(12) United States Patent  (10) Patent No.: US 7,982,934 B2
Champion  (45) Date of Patent: Jul. 19, 2011

(54) SCANNED BEAM DISPLAY WITH PARALLELOGRAM DISTORTION CORRECTION

(75) Inventor: Mark Champion, Kenmore, WA (US)

(73) Assignee: Microvision, Inc., Redmond, WA (US)

( * ) Notice: Subject to any disclaimer, the term of this patent is extended or adjusted under 35 U.S.C. 154(b) by 133 days.

(21) Appl. No.: 12/555,969

(22) Filed: Sep. 9, 2009

(65) Prior Publication Data

US 2011/0058108 A1    Mar. 10, 2011

(51) Int. Cl.
*G02B 26/08*    (2006.01)
(52) U.S. Cl. .................. 359/200.8; 359/224.1
(58) Field of Classification Search ............... 359/212.1, 359/213.1, 214.1, 223.1–226.1
See application file for complete search history.

(56) References Cited

U.S. PATENT DOCUMENTS 5,579,148 A * 11/1996 Nishikawa et al. ........ 359/214.1
* cited by examiner

*Primary Examiner* — Euncha Cherry
(74) *Attorney, Agent, or Firm* — Kevin D. Wills

(57) ABSTRACT

A scanning assembly (400) for use in a scanning display includes a reflective scanning surface, such as a scanning mirror (412). The reflected scanning surface can be mounted on a scan plate (409). The scanning assembly (400) is configured to pivot about a first axis (403) and a second axis (404) to form an image. To correct parallelogram distortion, the first axis (403) and second axis (404) are non-orthogonal relative to each other. Torsion arms (407, 408) facilitating rotation of the scanning mirror (412) along one axis (403) can be oriented non-orthogonally relative to other torsion arms (413, 414) by an amount sufficient to correct parallelogram distortion.

14 Claims, 6 Drawing Sheets

SCANNED BEAM DISPLAY WITH PARALLELOGRAM DISTORTION CORRECTION

BACKGROUND

Projection systems, such as those capable of projecting images onto screens, walls, and the like, are becoming smaller and more compact. By way of example, scanned beam displays employing lasers are becoming small enough to fit in portable electronic devices like palm sized computers, mobile telephones, personal digital assistants and gaming devices. Laser scanned beam displays create brilliant images with vibrant colors. The image quality associated with laser scanned beam displays is unmatched by systems using conventional projection devices. The advent of semiconductor lasers, such as laser diodes, allows these brilliant images to be created by a compact projector, at a reasonable cost, and while consuming small amounts of power.

In a scanned beam display, a mirror coupled to a scanning platform receives light from one or more light sources, such as lasers or light emitting diodes, and scans it in two dimensions along a projection surface to create an image. This scanning is frequently performed in a "raster pattern," where light is scanned horizontally along one scan axis, referred to as the "fast-scan axis." Between each fast-scan axis row, the light moves vertically to scan the next row. The vertical scanning movement occurs along a second scanning axis, which is often referred to as the "slow-scan axis." In ideal raster scanning, a predetermined number of horizontal rows are scanned a predetermined distance apart to form an image.

Scanning perfectly horizontal rows separated by equivalent vertical spaces can be difficult to achieve in compact scanned beam displays. For example, scanning platforms are physical devices that exhibit inertia during movement. This inertia limits physical capabilities of the scanning platform. Designers have learned to work with this inertia to produce images in compact systems by using a sinusoidal scan function to drive the scanning platform. In doing so, an image can be scanned more efficiently.

Image resolution problems can arise, however, when trying to approximate a true raster scan with a sinusoidal waveform. There is thus a need for a scanning device suitable for compact projection systems capable of providing distortion correction.

Figure 1:
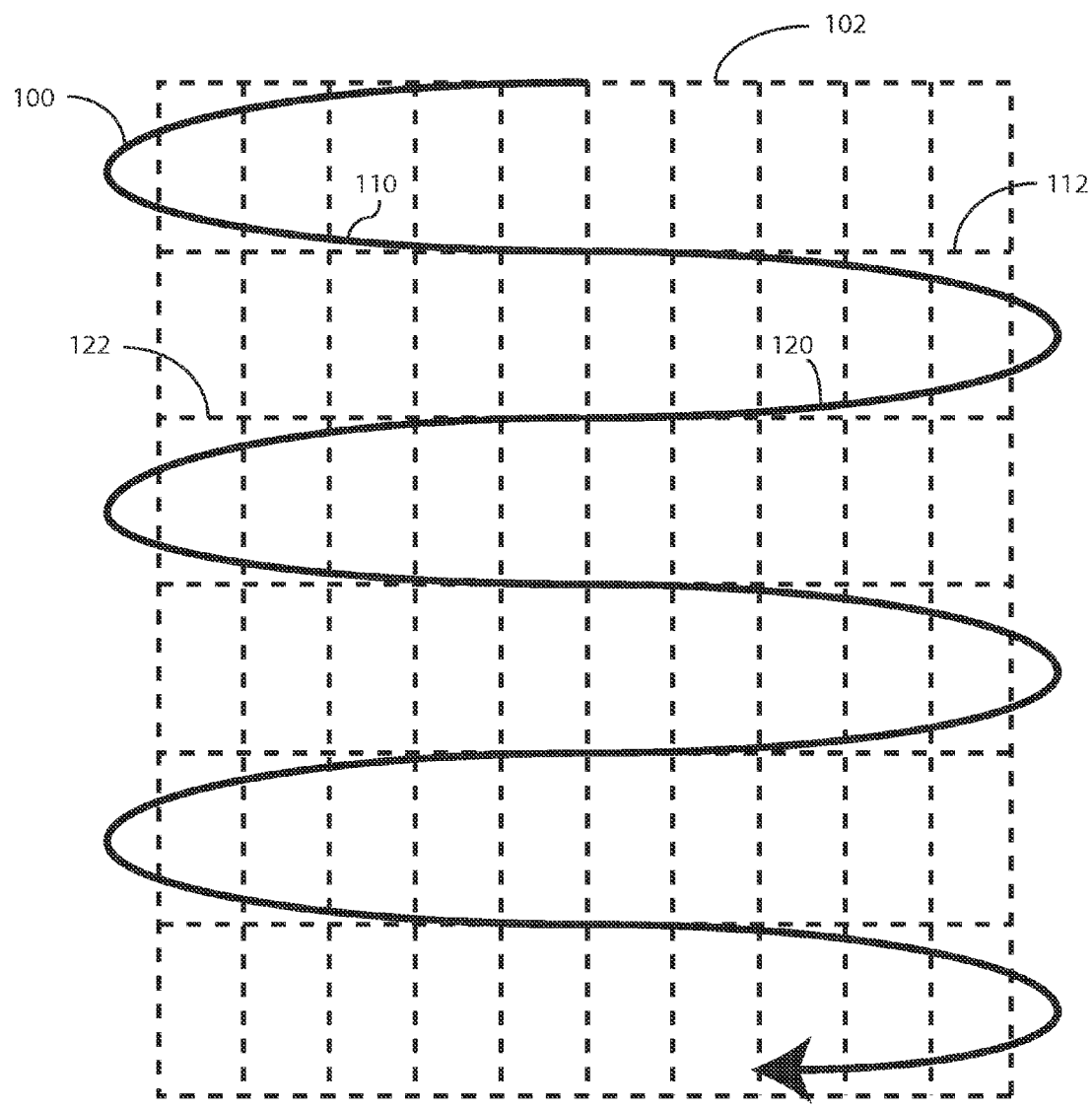
FIG. 1 illustrates ideal and practical raster scans used in compact imaging systems.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to image distortion correction in a scanned beam display. It will be appreciated that embodiments of the invention described herein may be comprised of one or more conventional processors and unique stored program instructions that control the one or more processors to implement, in conjunction with certain non-processor circuits, some, most, or all of the functions of causing the scanning platform to pivot as described herein. As such, these functions may be interpreted as steps of a method to perform the scanning platform control. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention provide a scanning platform in an image projection system that is designed so as to correct in hardware the parallelogram distortion that can occur in scanned beam displays. Parallelogram distortion causes a square-shaped projected image to appear slanted, like a parallelogram. Parallelogram distortion can occur in magnetically driven scanning platforms, for example, when the slow-scan axis drive signal couples into the fast-scan axis movement of the scanning platform.

Parallelogram distortion can occur in various types of scanning systems. This distortion often occurs where the slow-scan axis drive signal couples to the fast-scan axis motion. One such system that can exhibit parallelogram distortion is a microelectromechanical (MEMS) scanning platform. A MEMS scanning platform is useful in describing parallelogram distortion because the very small MEMS mirrors of these scanning platforms are generally driven by magnetic control signals. Where both the fast-scan drive signal and slow-scan drive signal are magnetic, portions of each signal can affect the movement of the platform along the other axis. In other words, portions of the slow-scan axis control signal can affect fast-scan movement. While a MEMS scanning platform will be used herein for discussion purposes, it will be clear to those of ordinary skill in the art having the benefit of the disclosure that embodiments of the parallelogram distortion correction described herein can be adapted to other scanning platforms exhibiting parallelogram distortion as well.

Turning briefly to FIG. 1, illustrated therein is one example of a raster scan waveform used to generate images in compact, scanning imaging systems, such as those described herein. The raster trajectory waveform of FIG. 1 can exhibit parallelogram distortion as will be described below. In FIG. 1, a raster scan waveform is created by a sinusoidal scan trajectory 100. This "practical" raster scan waveform is superimposed upon a grid 102 representing an ideal raster pattern. The ideal rows are shown as horizontal dashed lines, with vertical spacing shown along the vertical dashed lines.

The sinusoidal scan trajectory 100 sweeps back and forth left-to-right in a sinusoidal pattern, and sweeps vertically (top-to-bottom) by way of a saw-tooth vertical drive signal. When a scanning mirror deflects modulated light in accordance with this trajectory 100, an image can be created. The vertical sweep rate is typically set such that the number of visible horizontal sweeps equals the number of rows in the grid, and the vertical scan position at any time is approximated as a corresponding row. For example, each horizontal sweep 110 from left-to-right corresponds to one row 112 and the following sweep from right-to-left 120 may correspond to the next row 122.

Figure 2:
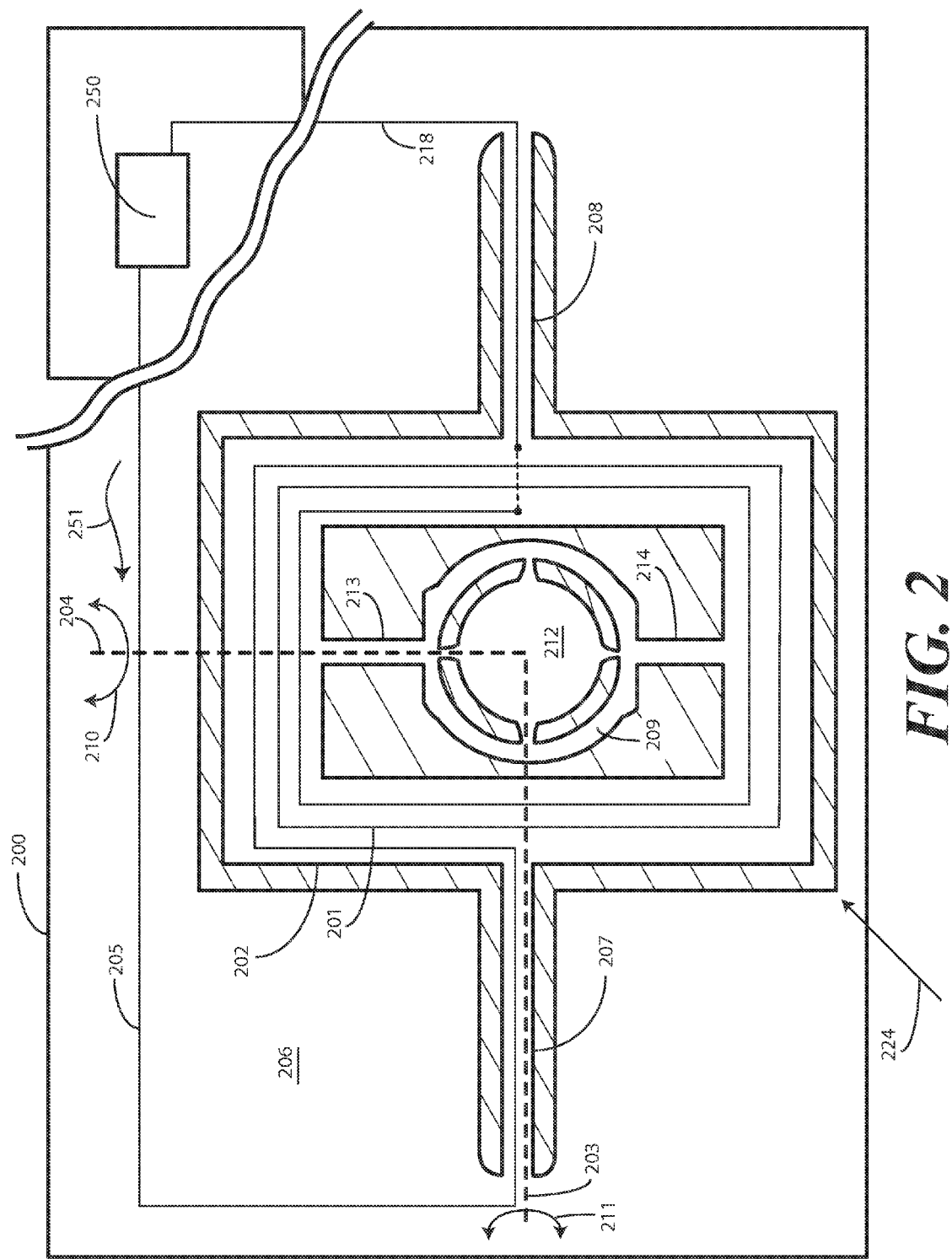
FIG. 2 illustrates one embodiment of a scanning assembly.

Turning now to FIG. 2, illustrated therein is one embodiment of a MEMS scanning platform 200 that may be driven with the raster scan of FIG. 1. This scanning platform 200 of FIG. 2 is also described in commonly assigned U.S. patent application Ser. No. 12/496,892 entitled, "Phase Locked Resonant Scanning Display Projection," filed on Jul. 2, 2009, which is incorporated herein by reference.

Note that there are many different ways in which a scanning platform can be assembled and the illustrative embodiment of FIG. 2 will be used for discussion purposes only. It will be clear to those of ordinary skill in the art having the benefit of this disclosure that embodiments of the invention are not so limited. Embodiments of the present invention may be adapted to other types of scanners as well.

The principal scanning component of the scanning platform 200 is a moving reflective surface, shown in FIG. 2 as a scanning mirror 212. When a single reflective surface is used to scan in two axes, a gimbal ring 202 construction may be used to facilitate appropriate rotation.

While the scanning mirror 212, gimbal 202, or other scanning components can each be configured to move in a variety of ways, in the illustrative embodiment of FIG. 2, a driver 250 delivers a unitary drive signal 251, causing a corresponding current to pass through the windings of the single drive coil 201. Concurrently, an external magnetic field source disposed near the scanning platform 200 (and not shown in FIG. 2) imposes a static magnetic field on the single coil 201. The magnetic field imposed on the single coil 201 by the external magnetic field source has a component 224 in the plane of the coil, and is oriented non-orthogonally with respect to the two drive axes as indicated by arrow 224 in FIG. 2. The in-plane current in the windings of the single coil 201 interacts with the in-plane magnetic field component 224 to produce out-of-plane Lorentz forces on the conductors of the coil 201. As the drive current forms a loop, the current reverses sign across the scan axes 203,204. This means the Lorentz forces also reverse sign across the scan axes 203,204, which results in a torque in the plane of—and normal to—the magnetic field. This combined torque produces responses in the two scan directions, depending on the frequency content of the torque, thereby causing motion about the axes 203, 204. This motion can result in a scanning trajectory such as that show in FIG. 1 for example. The scanning mirror 212 moves relative to the support structure 206 in response to the torque. Torsion arms 207,208,213,214 twist as the scanning mirror 212 undergoes an angular displacement with respect to the support structure 206. The drive signal 215 can cause the scanning mirror 212 to sweep back and forth at the frame rate of incoming video.

Note that in one embodiment, the driver 250 can be integrated with the scanning platform 200 as an integrated device. Alternatively, the driver 250 can be disposed on a substrate or assembly that is physically separate from the scanning platform 200. In this configuration, electrical traces may couple the driver substrate and scanning platform together. The break lines of FIG. 2 illustrate that the driver 250 can be integral with, or separate from, the scanning platform 200.

The scanning platform 200 can be manufactured with a very small form factor. In the embodiment of FIG. 2, a fixed outer support structure 206 acts as a structural component for the scanner and other mounting features. The outer support structure 206 includes traces 205, 218 for transmitting the electromechanical drive signals from the driver 250 to a coil 201. The outer support structure 206 supports the gimbal 202 on torsion arms 207 and 208.

The torsion arms 207 and 208 allow the gimbal 202 to rotate about a first axis 203 as indicated by arrow 211. Suspended within the gimbal 202 is an oscillator or scan plate 209. The scan plate 209 has a reflective scanning surface disposed thereon, which may take the form of a plate that has a mirror formed thereon. In FIG. 2, the reflective surface is that of a scanning mirror 212. Torsion arms 213 and 214 couple the scan plate 209 to the gimbal 202, and allow the scanning mirror 212 to rotate about axis 204 as indicated by arrow 210. A drive coil 201 is coupled to the driver 250 by the electrical traces.

The gimbal 202 and scan plate 209 moves about axis 203, which in this illustrative embodiment represents the slow-scan axis. Similarly, the scan plate 209 and the torsion arms 213 and 214 move about axis 204, which in this illustrative embodiment represents the fast-scan axis. The mass of scan plate 209 along with the stiffness of the torsion arms 213 and 214, determine a resonant frequency of the scan plate 209 about axis 204. The fast scan axis is normally operated at its resonant frequency.

In general as described herein, the designer has wide latitude in choosing a resonant frequency and amplification factor for each of the two axes 203,204. For a two-axis MEMS scanning platform 200, the resonant frequency of the scan plate's rotation about axis 203 may be selected to be significantly lower than the fast scan axis resonant frequency.

The driver 250 drives the single coil 201 in the illustrative embodiment of FIG. 2 to produce pivoting of the gimbal 202 and the scanning mirror 212 mirror about the axes 203,204. As described above, a current through the single coil 201 produces a dynamic magnetic field normal to the plane of the scan mirror. The external magnetic field source creates the static magnetic field with an in-plane component 224 that is normal to the dynamic field and non-orthogonal with axes 203 and 204 as shown in FIG. 2. The current though coil 201, in combination with the in-plane component 224 of the static magnetic field, results in a combined torque that produces responses in the two scan directions depending upon the frequency content of the drive signal, and corresponding frequency content of the torque as described above.

When the single coil 201 receives the drive signal from the driver 250, the scan plate 209 moves. Torsion arms 207,208, 213,214 twist as the scan plate 209 undergoes angular displacement with respect to the fixed outer support structure 206. When performing a raster scan, the scan plate 209 sweeps back and forth at a rate corresponding to the fastscan drive signal. The scanning mirror 212 thus moves accordingly in response to the torque. In one embodiment, the movement about axis 203 is configured to be near the resonant frequency of the scanning mirror 212.

Torsion arms 207,208 are, in one embodiment, longer than are torsion arms 213,314. Torsion arms 207,208 can be flexible members that undergo a torsion-type flexure, thereby allowing the gimbal 202, and accordingly the scan plate 209, to rotate about axis 203. While shown as being generally straight, it will be clear to those of ordinary skill in the art having the benefit of this disclosure that embodiments of the invention are not so limited. For example, in some embodiments, torsion arms 207,208 can have other sectional shapes, such as arcs, "S" shapes, or other generally serpentine shapes.

As a single drive signal is used to cause the scanning mirror 212 to pivot about two axes 203,204, some of the drive signal intended to cause torsion about axis 203 can cause the scan plate 209 and scanning mirror 212 to move about axis 204. This motion results in parallelogram distortion of the resulting raster image.

Figure 3:
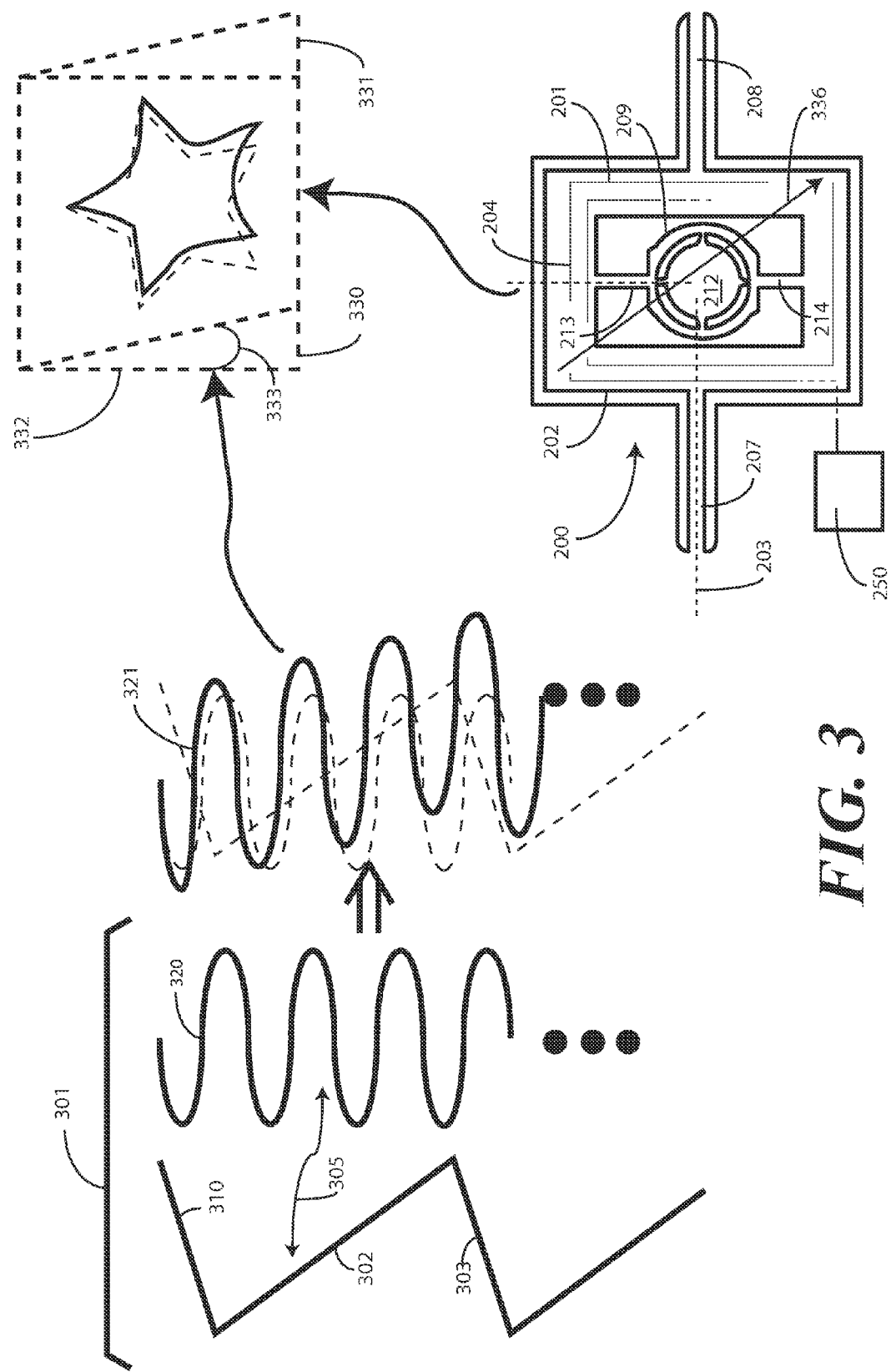
FIG. 3 illustrates parallelogram distortion.

Turning now to FIG. 3, raster scan waveform 301 will be used to illustrate how distortion can occur due to the application of a single composite signal to coil 201. In one embodiment, the raster scan waveform 301 is a single composite signal that includes a fast-scan axis waveform 320 and a slow-scan axis waveform 310, which are shown separately in FIG. 3 for discussion purposes. The fast-scan axis waveform 320 may be applied to make the scanning mirror 212 pivot about a first axis 204, while the slow-scan axis waveform 310 may be applied to make the scanning mirror 212 pivot about a second axis 203.

The slow-scan axis waveform 310, in this illustrative embodiment, is a saw-tooth waveform having a first composite frequency that is a combination of many frequencies, as would be the case in applications where the raster scan waveform 301 is a video signal. The fast-scan axis waveform 320 is a sinusoidal waveform in this illustrative embodiment. The fast-scan axis waveform 320 has a frequency that is higher than that of the composite slow-scan axis waveform 310. For example, the fast-scan axis waveform 320 will frequently be above 12 kHz, while the slow-scan axis waveform 310 will have a frequency of less than 120 Hz.

The rising portion 302 of the slow-scan axis waveform 310 corresponds to a raster sweep from top-to-bottom in a projected image. The flyback portion 303 corresponds to movement of the scanner from the bottom of an image to the top. After the flyback portion 303, the vertical sweep traverses substantially the same path on each trajectory.

The fast-scan and slow-scan waveforms are combined 305 in a driver 250 to create a composite waveform 321 that can be applied to a single drive coil 201 in a scanning platform 200. The mechanical characteristics of the fast-scan and slow-scan components of the scanning platform 200 work in practice as a filter. Ideally, the scan plate 209 and scanning mirror 212 will move about axis 204 in response to only the fast-scan axis waveform 320, while the gimbal 202, coil 201, and torsion arms 213,214, scan plate 209, and scanning mirror will move about axis 203 in response to only the slow-scan axis waveform 310. However, the parallelogram distortion, depicted in image 330 occurs where the actual image 331 deviates from an ideal image 332 by an angle of inclination 333. This occurs when the scan plate 209 exhibits off-axis motion in response to the slow-scan axis waveform 310 that is not in the slow-scan axis 203. This off-axis motion can occur because torque is applied off axis relative to the slow-scan axis 203. In short, whereas the ideal image 332 is a square or rectangle, the actual image 331 appears as a parallelogram.

Figure 4:
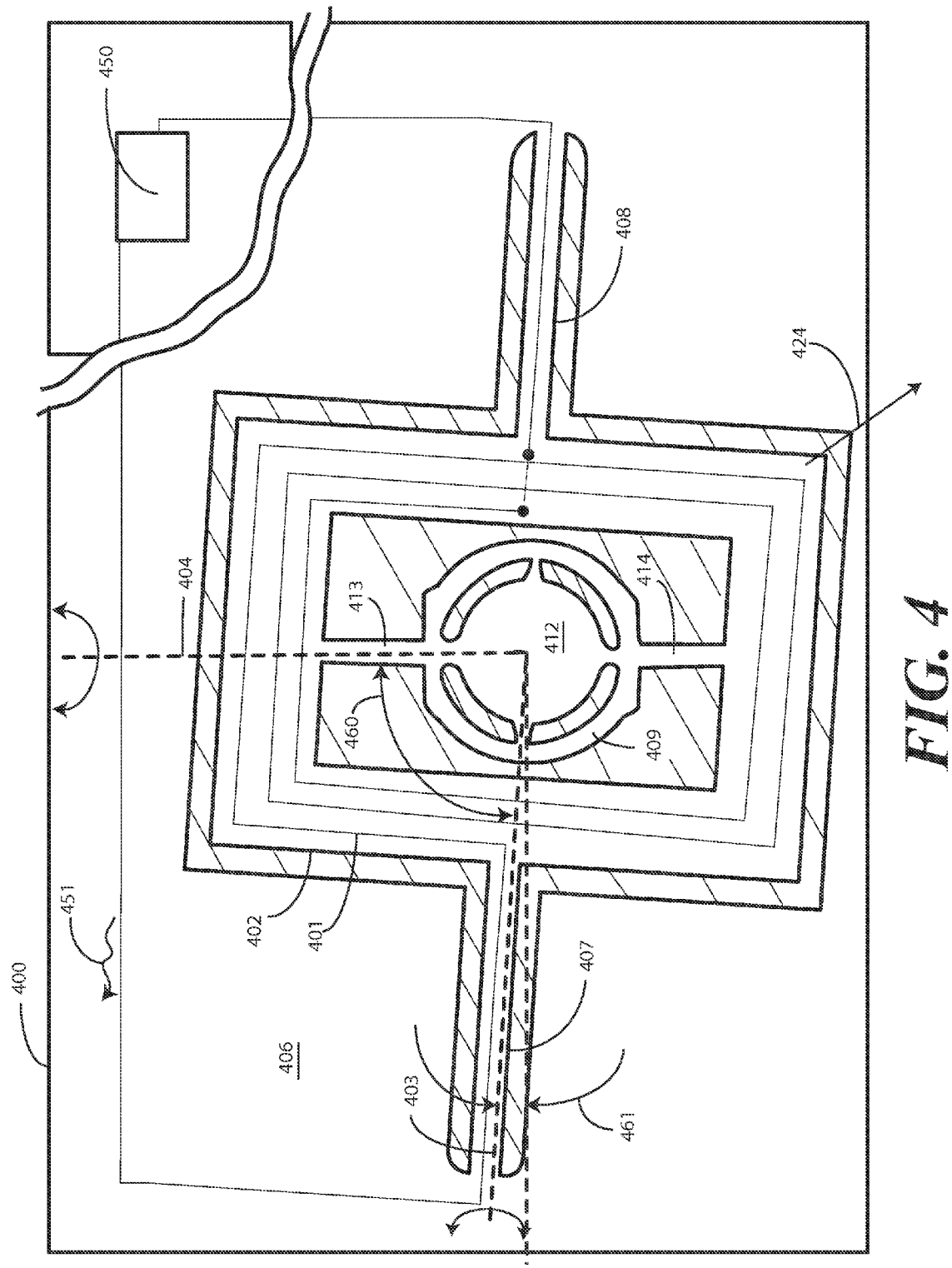
FIG. 4 illustrates one embodiment of a scanning assembly.

Turning now to FIG. 4, illustrated therein is a scanning assembly 400 configured to correct parallelogram distortion in hardware. The scanning assembly 400 can be used in a scanning display to project images on a projection surface. One such scanning display is a laser scanning display.

As shown in FIG. 2, the scanning assembly 400 of FIG. 4 includes a reflective scanning surface, such as scanning mirror 412, mounted on a scan plate 409 within a "modified" gimbal 402 that is responsive to a control signal 451 from a driver 450. The modified gimbal 402 of FIG. 4 is "modified" from the gimbal (202) of FIG. 2 in that the first axis 403 and second axis 404 are non-orthogonal by orienting torsion arms 407,408 in a non-orthogonal relationship with torsion arms 413,414. In one embodiment, the first axis 403, and second axis 404 are oriented non-orthogonally relative to each other by an amount corresponding to parallelogram distortion occurring in a scanning assembly having similar specifications and orthogonal torsion arms.

In one embodiment, the torsion arms 407,408 and torsion arms 413,414, and therefore first axis 403 and second axis 404 are oriented at an angle 460 of between 80 and 90 degrees, such as about 85 degrees. In one embodiment, the angle 460 will be between 88 and 90 degrees. As designers are capable of physically determining an amount of parallelogram distortion that will be present in the scanning assembly based upon the physical dimensions, drive amplitude, and other aspects of the system, the first axis 403 and second axis 404 are aligned non-orthogonally by a corresponding amount. For example, angle 461 which is the complement of angle 460, can be an angle that corresponds to the angle of inclination (333) that occurs due to the slowscan drive signal affecting the fastscan movement, the non-orthogonal application of the magnetic field relative to the axes 403,404, or combinations thereof.

This angle 461 can be determined in a variety of ways. For example, in one embodiment the designer can determine the amount of coupling that is likely to occur between the slow-scan axis drive waveform and the fast scan axis motion based upon a particular scanning assembly's physical structure and materials. The designer can, for instance, determine this coupling using the mass and distribution of mass within the scan plate 409, as well as the stiffness of the torsion arms 413 and 414. Similarly, the combined mass of the assembly comprising the modified gimbal 402, the torsion arms 407 and 408, and the scan plate 409 (and their mass distribution), along with the stiffness of the torsion arms 413 and 414, will be factors in this determination. The designer then sets the angle 461 to be proportional to the amount of parallelogram distortion. Using such a physical structure, complex processing power and software distortion correcting algorithms are not required.

In another embodiment, the designer can empirically measure the amount of parallelogram distortion by creating a gimbal with orthogonal axes of rotation. This gimbal can then by used to create a projected image with which the parallogram distortion can be measured. The designer can then set angle 416 to be proportional to the measured parallelogram distortion.

In yet another embodiment, the designer can determine the proper angle 461 by using a gimbal having orthogonal torsion arms and then clocking the static magnetic field 424 to obtain a corrected image. By clocking the angle of this field, the parallelogram distortion can be effectively nulled out.

As noted above, parallelogram distortion occurs when the slow-scan drive signal results in fast-scan motion. The amount of parallelogram distortion depends on the ratio of fastscan rotation and slowscan rotation in response to the slowscan drive signal. This response ratio is affected by the angle of the static magnetic field 431. As the static magnetic field 431 is oriented to be more parallel with the fastscan axis, the slowscan drive signal produces increasing rotation of the gimbal about the slowscan axis and less rotation of the gimbal about the fastscan axis.

When using the scanning assembly 400 of FIG. 4, a designer can make macro corrections to parallelogram distortion by orienting the first axis 403 and second axis 404 non-orthogonally by orienting torsion arms 407,408 in a non-orthogonal relationship with torsion arms 413,414. The designer can then use the clocking technique referenced above to make micro corrections to the scanning assembly 400 so as to provide a near-perfectly projected image. Specifically, after viewing a projected image with the scanning assembly 400 of FIG. 4, a designer or technician can then clock the angle of the static magnetic field to "trim" the amount of resulting parallelogram distortion during the manufacturing process. Note that clocking the angle also affects rotation about the fastscan axis due to the fastscan drive signal. However, the fastscan drive signal amplitude can be adjusted without affecting parallelogram distortion. In this way, the slowscan axis clocking angle, represented by angle 461 can be fixed in a given scanning platform 400, while minor corrections to any remaining parallelogram distortion to be trimmed out during the manufacturing process.

Figure 5:
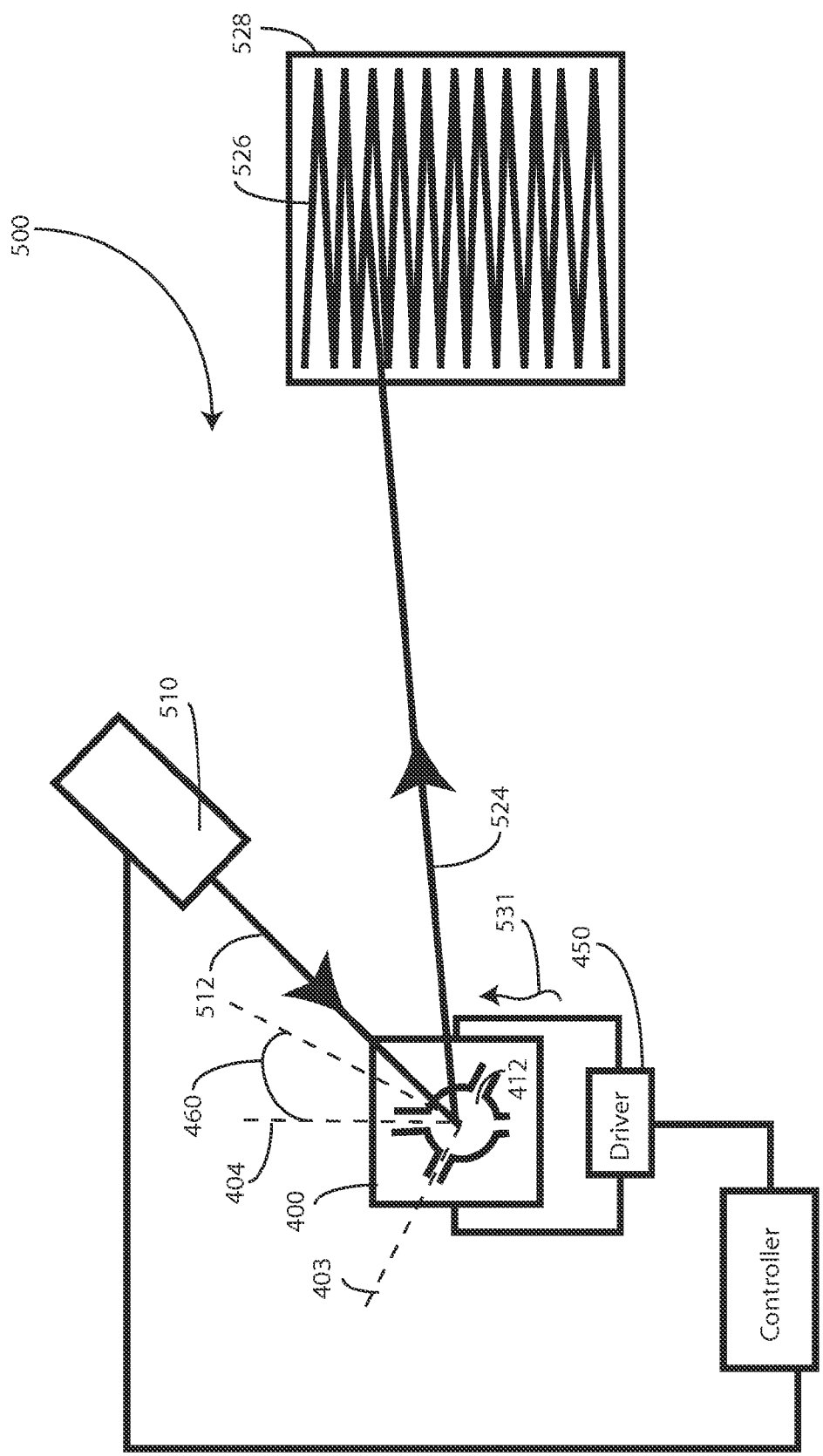
FIG. 5 illustrates one embodiment of an image projection system.

Turning now to FIG. 5, illustrated therein is a diagram of an exemplary projection source suitable for use with embodiments of the invention. The illustrative projection source shown in FIG. 5 is a MEMS laser scanned beam display 500 using the scanning assembly of FIG. 4 as previously described. Such a MEMS laser scanned beam display 500 can be used, for example, with an optical relay in a head up display.

As shown in FIG. 5, the laser scanned beam display 500 comprises a modulated light source 510, which can comprise one or more laser light sources. The laser light sources can be semiconductor lasers or the like. The scanning assembly 400 of FIG. 4 is operative as an electromechanically controllable scanning assembly that receives light 512 from the light source 510 and pivots about a first axis 403 and a second axis 404, which are non-orthogonal with each other, in response to a drive signal 531 from driver 450. This pivoting action scans the light 512 horizontally and vertically, in one embodiment, in a raster pattern 526. The scanning assembly 400 thus delivers scanned light 524 to a projection surface to form an image 528. The scanning mirror 412 may sweep the scanned light 524 horizontally at a relatively higher frequency and also vertically using relatively lower frequency components, thereby creating substantially a raster pattern 526.

The driver 450 is operative to pivot the scanning mirror 412 about the first axis 403 and second axis 404, respectively. (Note that the terms "horizontal" and "vertical" are used relative to the orientation as viewed in FIG. 5, and may be rotated by ninety degrees without changing the operation of the overall system.) The driver 450 does this by delivering a control signal 531 to the scanning assembly 400.

Figure 6:
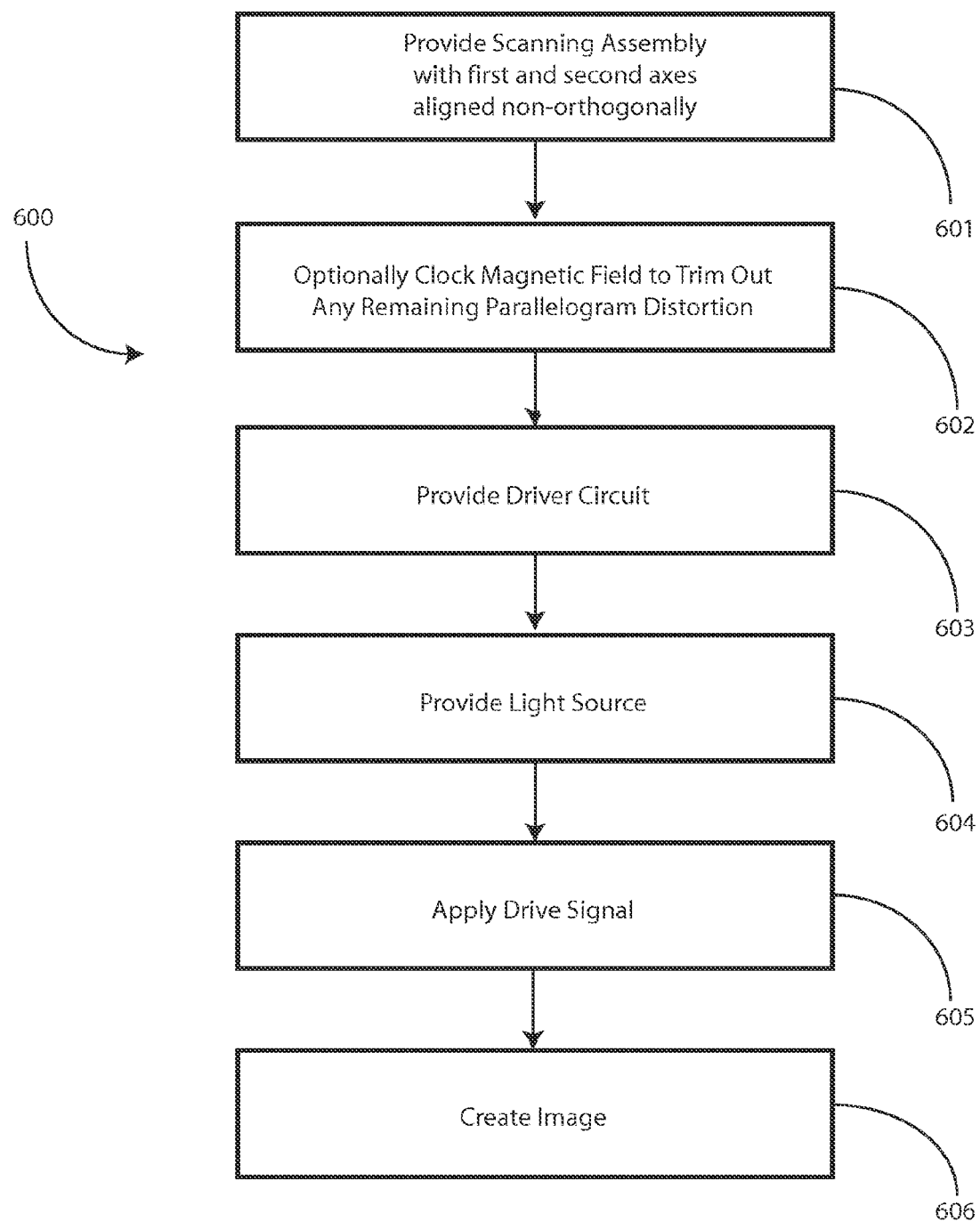
FIG. 6 illustrates one embodiment of a method of projecting an image.

Turning now to FIG. 6, illustrated therein is a method 600 for creating a projected image without parallelogram distortion by scanning light in a raster pattern. Such a method 600 may be used, for example, by a manufacturer of scanned image projection systems.

At step 601, a scanning assembly having a reflective surface capable of scanning light received from a light source by pivoting on a first axis and a second axis is provided. The first axis and second axis are non-orthogonal, which provides parallelogram distortion correction. In one embodiment, the designer may determine the amount from which the alignment of the first and second axis deviate from the orthogonal by determining an amount of first axis drive signal causing the scanning assembly to pivot about the second axis. The designer may then orient the pivot or torsion arms of the scanning assembly such that the first axis and the second axis are oriented non-orthogonally by an angle proportional to the amount of the first axis drive signal causing the scanning assembly to pivot about the second axis.

At step 602, the designer optionally clocks the static magnetic field relative to the first and second non-orthogonal axes to make micro corrections to the scanning assembly 400 as described above so the scanning platform will provide near-perfect images. The designer or technician can rotate the angle of the static magnetic field by minor amounts to trim out any resulting parallelogram distortion during the manufacturing process.

At step 603, a driver circuit operative to cause the scanning assembly to pivot about the first axis and the second axis is provided. The driver circuit accomplishes this by delivering a composite drive signal, comprised of a first axis drive signal and a second axis drive signal, to the scanning assembly. In one embodiment, the first axis drive signal and second axis drive signal are configured to electromechanically control the scanning assembly by creating a magnetic field within the scanning assembly.

At step 604, a modulated light source is provided. The light source projects light onto the scanning assembly so that it may be scanned to form an image. In one embodiment, the light source comprises one or more modulated laser light sources.

At step 605, the drive signal is applied to the scanning assembly. This causes the light delivered from the light source to be scanned. In one embodiment, this scanning occurs in a raster pattern. In one embodiment the first axis drive signal comprises a vertical drive signal composed of relatively low frequency components. Examples of vertical drive signals include sawtooth, triangular, or sinusoidal waveforms. In one embodiment, the second axis drive signal comprises a horizontal drive signal having a fundamental frequency greater than the first frequency components. An example of a horizontal drive signal that is frequently used is a sinusoidal waveform, although others may be used as well. At step 606, the image is created.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A scanning display to project an image on a projection surface, comprising:

a scanning assembly comprising a reflective scanning surface mounted so as to be pivotable about a first axis and a second axis in response to one or more control signals to deflect a light beam, wherein the reflective scanning surface is connected to a gimbal by a first set of torsion arms corresponding to the first axis, wherein the reflective scanning surface is immediately surrounded by the gimbal, and wherein the gimbal is rotatable on a second set of torsion arms corresponding to the second axis; and a driver operative to cause the reflective scanning surface to pivot about the first axis and the second axis by actuating the reflective scanning surface with the one or more control signals, wherein the reflective surface directs the light beam so as to scan the image on the projection surface;

wherein the first axis is aligned non-orthogonally relative to the second axis so as to substantially correct for parallelogram distortion in the image.

2. The scanning display of claim 1, wherein the one or more control signals comprise a sinusoidal horizontal drive signal having a first frequency.

3. The scanning display of claim 2, wherein the one or more control signals comprise a vertical drive signal comprising a sawtooth waveform.

4. The scanning display of claim 3, wherein the driver is operative to cause the reflective scanning surface to move substantially in a raster pattern.

5. The scanning display of claim 1, wherein the one or more control signals comprise a horizontal drive signal operative to pivot the reflective scanning surface about the first axis and a vertical drive signal operative to pivot the reflective scanning surface about the second axis, wherein the scanning assembly is configured such that the first axis is aligned non-orthogonally relative to the second axis by an angle proportional to an amount of the vertical drive signal causing the reflective scanning surface to pivot about the first axis.

6. The scanning display of claim 1, wherein the first axis and the second axis are oriented at an angle of more than 80 and less than 90 degrees relative to each other.

7. The scanning display of claim 6, wherein the angle is between 88 and 90 degrees.

8. The scanning display of claim 6, wherein the scanning assembly comprises a scanning mirror mounted on a base.

9. The scanning display of claim 1, further comprising a single coil coupled to the driver and disposed about the reflective scanning surface.

10. A laser scanning image system to project an image on a projection surface, comprising:

one or more laser light sources; and an electromechanically controllable scanning assembly configured to receive light from the one or more laser light sources and to pivot about a first axis and a second axis in response to a drive signal to scan the light horizontally sinusoidally and vertically in a sawtooth pattern, wherein the electromechanically controllable scanning assembly comprises:

a reflective scanning surface; and a gimbal, wherein the reflective scanning surface is connected to the gimbal by a first set of torsion arms corresponding to the first axis, wherein the reflective scanning surface is immediately surrounded by the gimbal, and wherein the gimbal is rotatable on a second set of torsion arms corresponding to the second axis, wherein the reflective surface directs the light so as to scan the image on the projection surface;

wherein the first axis is aligned non-orthogonally relative to the second axis so as to substantially correct for parallelogram distortion in the image.

11. The laser scanning image system of claim 10, further comprising a driver operative to pivot the electromechanically controllable scanning assembly about the first axis and the second axis by delivering one or more drive signals to the electromechanically controllable scanning assembly.

12. The laser scanning image system of claim 11, wherein the one or more drive signals comprise a magnetic field comprising a horizontal drive component operative to pivot the electromechanically controllable scanning assembly about the first axis and a vertical drive component configured to pivot the electromechanically controllable scanning assembly about the second axis.

13. The laser scanning image system of claim 12, wherein the first axis and the second axis are aligned non-orthogonally by an angle proportional to an amount of the vertical drive component that is operative to pivot the electromechanically controllable scanning assembly about the first axis.

14. The laser scanning image system of claim 13, wherein the electromechanically controllable scanning assembly comprises a MEMS scanning assembly.

* * * * *